UNITED STATES PATENT OFFICE.

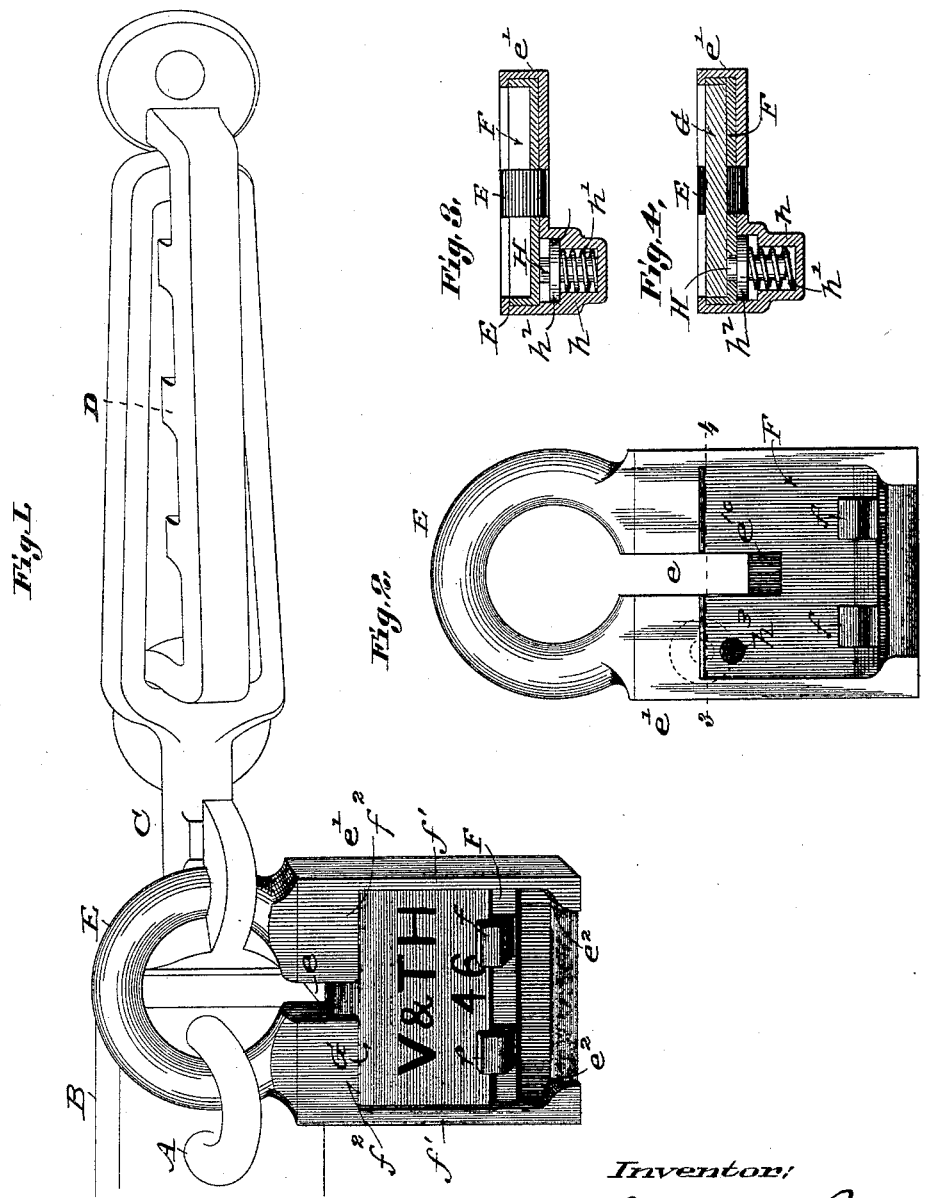

LEWIS A. BROWN, OF ST. LOUIS, MISSOURI.

SEAL-LOCK.

SPECIFICATION forming part of Letters Patent No. 394,094, dated December 4, 1888.

Application filed June 3, 1888. Serial No. 276,464. (No model.)

*To all whom it may concern:*

Be it known that I, LEWIS A. BROWN, of St. Louis, Missouri, have made a new and useful Improvement in Seal-Locks, of which the following is a full, clear, and exact description.

August 30, 1887, No. 369,185, there has been patented an improvement in fasteners for doors in which a slotted link is used to connect a hook and staple, the hook having a point adapted to be passed through the slot in the link, and the construction being such as to require the hook-point in operating the fastening to be passed through the slot. There has also, February 28, 1888, No. 378,655, been patented an improvement based upon the construction above referred to, and which has for its object the application of a seal to the slot in the link in such a manner that the fastening cannot be operated without breaking the seal. I have also made an improvement in seal mechanisms described in a pending application for Letters Patent, in which the case of the mechanism is made to contain a seal-holder and a seal, and the mechanism is operated by applying the seal to the seal-holder and moving the two parts in the case until the seal-holder becomes fastened therein, in which position it serves to fasten or to guard the fastening of the locking bolt or bar of the seal mechanism, and before the seal-holder can be moved back again to free the locking bolt or bar the seal must be broken.

The improvement under consideration is related to the constructions above referred to in that a seal, seal-holder, hook, staple, and slotted link are employed. No lock, however, is used, the link serving to hold the seal and seal-holder, and the seal and seal-holder being applied to the link across its slot, but in such application being movable upon the link to bring the seal-holder and also the seal into position to be fastened therein, and from which position the seal-holder nor the seal cannot be moved without breaking or destroying the seal, substantially as is hereinafter set forth and claimed, aided by a reference to the annexed drawings, making part of this specification, in which the most desirable mode of carrying out the improvement is shown, and in which—

Figure 1 is a view in perspective of the improvement as in use, the hook and staple and the parts to which they are respectively fastened being shown in outline, and the link and the parts contained therein being shown more prominently; Fig. 2, a front elevation of the link, the seal-holder being drawn downward in the link and no seal being shown; Fig. 3, a section on the line 3 4 of Fig. 2, the parts being as in Fig. 2; and Fig. 4, a section on the same line, 3 4, Fig. 2, but showing the seal also and the parts as when the seal-holder is locked in the link.

The same letters of reference denote the same parts.

In Fig. 1, A represents the staple; B, the part to which the staple is fastened; C, the hook; D, the part with which the hook is permanently engaged, and being in the present instance an elongated staple; and E, the link, or "lock-casing," as it will be termed, which is used to unite the staple A and the hook. The slot in the lock-casing through which the hook-point $c$ is passed in attaching and detaching the hook is shown at $e$. That portion, $e'$, of the lock-casing in which the slot is formed is suitably shaped, both externally and internally, substantially as shown, to receive the seal-holder F and the seal G. The seal-holder F is essentially a frame recessed or equivalently shaped to receive the seal, and it is adapted to be moved in or upon the lock-casing so as, after receiving the seal, to carry it into such a position across or partly across the slot as to bar the passage of the hook-point when it is attempted to pass that part through the slot.

In Fig. 2 the seal-holder is shown in the position in which the seal is applied to it.

The seal-holder is suitably confined in the lock-casing, so that, while it can be moved therein or thereon in the manner described, it cannot be detached from the link, to which end the lock-casing is made to overhang the side edges of the seal-holder, as shown in Figs. 3 and 4, and to project beneath it, as shown at $e^2 e^2$, Fig. 1.

The seal G, when applied to the seal-holder, is confined at its lower and side edges, say by dropping the lower edge of the seal within the lugs $ff$ upon the seal-holder, and by having the side edges of the seal come, respectively, against the side flanges, $f'$ $f'$, of the seal-holder, and when the seal-holder is moved upon the lock-casing to bring the seal into position to bar the hook-point, as in Fig. 1, the upper edge of the seal is carried beneath and thereby confined within the flanges $f^2$ $f^2$ of the lock-casing.

The seal is of some material which prevents it from being sprung out of its described position in the seal-holder and lock-casing. A glass plate of the proper superficies is the form in practice. The seal-holder is slotted at $e^{10}$, Fig. 2, to provide room for the passage of the hook-point. The seal-holder is adapted to be fastened in its up position—that is, when it is holding the seal to bar the passage of the hook-point—by means of the pin H, Figs. 2, 3, and 4. This pin is contained in a chamber, $h$, at the back of the lock-casing, and it is actuated by a spring, $h'$, which, pressing at one end against the shell of the chamber $h$ and at the other end against a shoulder, $h^2$, upon the pin, acts to thrust the pin forward, and when the seal-holder is moved into its up position, Figs. 1 and 4, the pin is thrust outward through a perforation, $h^3$, in the seal-holder, and the seal-holder is thereby locked in that position. The seal now covers the perforation $h^3$, and the outer end of the pin and the seal-holder cannot be reached until the seal is broken, when, by depressing the pin sufficiently to come in the rear of the seal-holder, Fig. 4, the seal-holder can be drawn downward into its position of Fig. 2.

This improvement, while not restricted thereto, is especially adapted to car-seals, and to that end a paper strip bearing any desirable data, as indicated by the letters "V. & T. H., 46," Fig. 1, may be applied to the back or in the rear of the seal G, to be destroyed by the breaking of the seal or left intact, as may be desired.

I claim—

1. The combination of the slotted lock-casing, the slotted seal-holder and a fastening therefor, the seal, and the hook having the hook-point, said seal and seal-holder being movable upon the lock-casing, substantially as described.

2. The combination of the staples A D, the hook, the slotted lock-casing, the seal-holder, the seal, the pin, and the spring, substantially as described.

Witness my hand this 5th June, 1888.

LEWIS A. BROWN.

Witnesses:
C. D. MOODY,
JAS. W. ALLEN.